ELECTRONIC SWITCH FOR ROTATING HEAD RECORDER
Filed Feb. 16, 1961
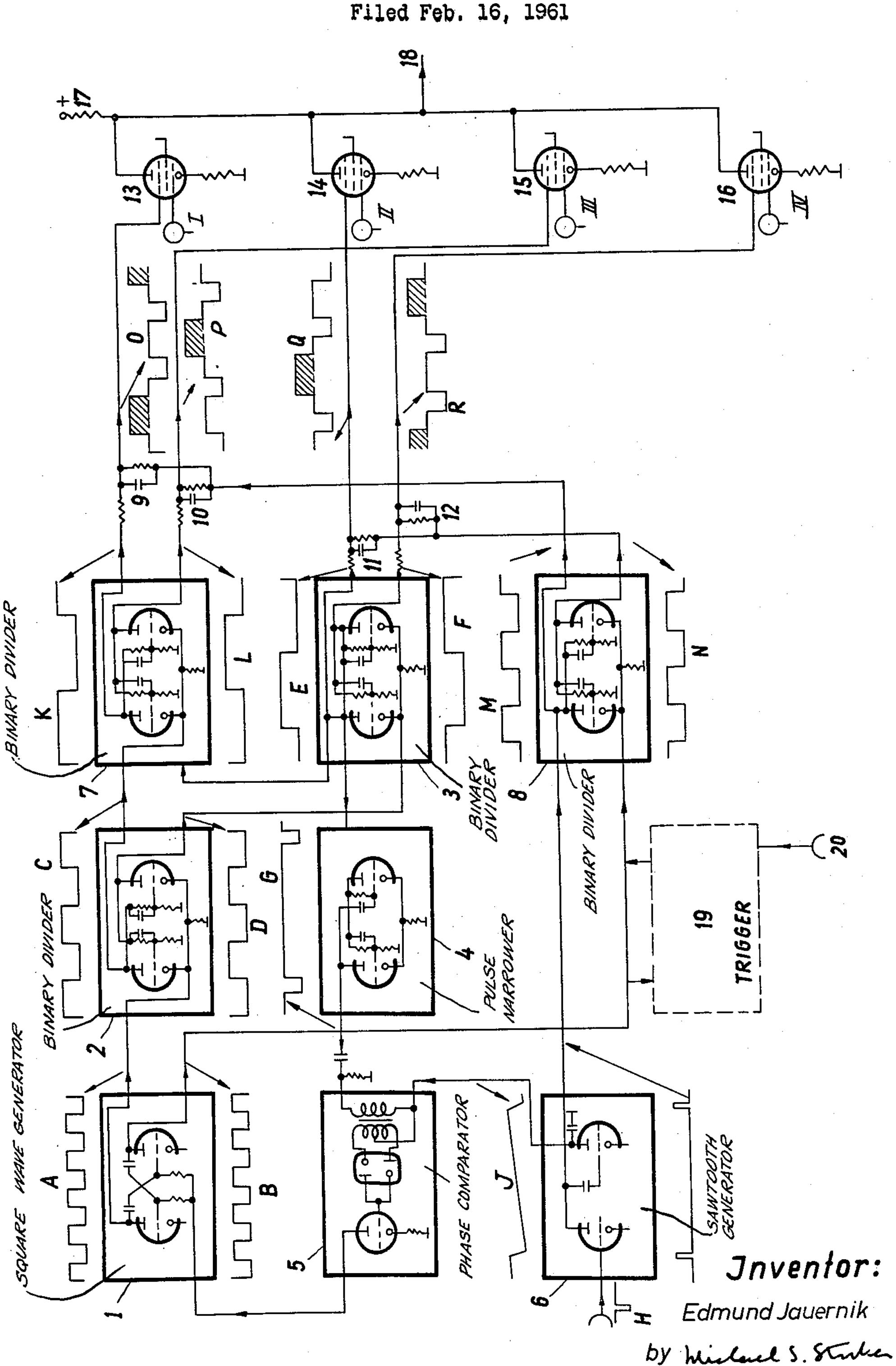
Jnventor:
Edmund Jauernik
by Michael S. Striker
Attorney United States Patent Office 3,084,214

Patented Apr. 2, 1963

3,084,214

ELECTRONIC SWITCH FOR ROTATING HEAD RECORDER

Edmund Jauernik, Darmstadt, Germany, assignor to Fernseh G.m.b.H., Darmstadt, Germany Filed Feb. 16, 1961, Ser. No. 89,685
Claims priority, application Germany Feb. 17, 1960
7 Claims. (Cl. 178—6.6)

This invention relates to an electronic sequence switch by means of which a plurality of input circuits may be connected in non-overlapping sequence to an output circuit. A particular application for a switch of this kind exists in systems for reproducing signals, which have been recorded upon magnetic tape in a series of transversely extending tracks, by the use of a plurality of transducer heads mounted upon a rotating member which become operative in sequence to recover the signals recorded upon successive tracks on the tape. Since the signals recorded upon successive tracks overlap somewhat, the change-over from the operative head to the next in succession should take place very rapidly, so that in practice it becomes essential to employ an electronic switching device.

In order to ensure the correct timing of the switching operations it is usual to derive reference signals from the rotating member and to use these to develop the switching impulses which effect the actual switching operation. This may be done by making the rotating member black over one-half of its circumference and white over the other half and reflecting light from its surface on to a photoelectrically sensitive device in which there is thus produced a periodically fluctuating current of which the periodic rate corresponds to the speed of revolution of the head drum. From this fluctuating current the switching impulses for operating the electronic switching elements are derived by frequency multiplication and shaping. In this system the initial fluctuating current varies more or less sinusoidally and it is thus difficult to use it to determine the timing of the switching points with the necessary accuracy.

In another known system, short reference impulses are therefore employed to control the switching points, these reference impulses being developed, for example, by illuminating a disc which is arranged for rotation with the rotating member which carries the transducer heads and is pierced by as many holes as the number of transducer heads. Light passing through the holes on to a photoelectrically sensitive device generates a correctly timed succession of switching impulses. A further aperture in the rotating disc cooperates with a further photoelectrically sensitive device to generate an additional impulse occurring once per revolution which serves to ensure the correct switching sequence. This system suffers from the disadvantage that the angular distribution of the holes used for generating the reference impulses must correspond with great accuracy to the angular distribution of the transducer heads on their rotating member. In addition, the need to generate more than one set of impulses leads to increased expense.

It is therefore a main object of this invention to provide for a system for the purpose set forth which yields more saitsfactory results.

It is a further object of this invention to provide for a system of the type mentioned which is comparatively simple in its structure and reliable in operation.

According to the present invention an electronic switch for connecting a plurality of input terminals to an output terminal in a non-overlapping sequence of which the periodicity is equal to that of a synchronizing signal comprises an oscillation generator operable at a frequency which is a multiple of the periodicity of said synchronizing signal, means for deriving by frequency division from the output of said oscillator a comparison signal repetitive at the periodicity of said synchronizing signal, means for comparing said comparison signal with said synchronizing signal to develop an error signal of which the magnitude represents any discrepancy from a predetermined phase relation between said synchronizing and comparison signals, means for applying said error signal to control the frequency of said oscillator so as at least substantially to maintain said predetermined phase relation, means for deriving by repeated binary frequency division from the output of said oscillator square-wave signals of different frequency and polarity, means for combining selected ones of said square-wave signals to yield a said plurality of complex signals each including a portion of maximum excursion recurrent at the periodicity of said synchronizing signal and having mutually exclusive, equal durations together equal to the periodic time of said synchronizing signal and means for applying said complex signals to respective switching devices each controlling a signal channel connecting an individual one of said input terminals to said output terminal in such a manner that only the maximum positive-going excursion in said complex signals cause said switching devices to allow signals to pass.

The special advantage gained by the use of the present invention is that a plurality of switching operations are effected with very great accuracy of timing within the switching period determined by a single reference impulse train.

According to an extension of the invention the comparison signal derived by frequency division from said oscillator output is passed through a preferably adjustable phase shifter before being compared in phase with said synchronizing signal. The advantage of this arrangement is that it is then not necessary for the synchronizing signal to have an exactly predetermined phase relation to the instants at which the switching operations are required to occur, since the exact adjustment of the phase relation may be effected by means of the phase shifter.

The novel features which are considered as characteristic for the invention are set forth in particular in the appended claims. The invention itself, however, both as to its construction and its method of operation with additional objects and advantages thereof will be best understood from the following description of a specific embodiment when read in connection with the accompanying drawing. This drawing represents a schematic diagram of an electronic switch corresponding to the invention. In this drawing special circuits known per se are illustrated in the form of blocks.

The embodiment illustrated is especially suitable for use in connecting the four transducer heads of a known type of reproducing device for magnetic signals in appropriate sequence to an output terminal. It will be assumed that the magnetic head drum rotates at 15,000 revolutions per minute, that is, 250 revolutions per second.

The switch operation is controlled by an oscillator 1, conveniently a square-wave generator, having for the speed of operation a nominal frequency of 1000 c./s. As indicated in the drawing, the oscillator may be a symmetrical multivibrator arranged to develop square-wave output signals A and B of the opposite polarity. The pulse train A, of which the first impulse occurring during each switching cycle is positive-going, is applied to control a binary dividing stage 2 which again is formed symmetrically and is arranged to provide square-wave output signals C, D of opposite polarity and having a common recurrence frequency of 500 c./s. Pulse train D, of which the first impulse occurring at the beginning of a switching period is negative-going, is applied to control a further symmetrical binary divider 3, which may be identical in construction with divider 2. Divider 3 again provides square-wave output signals of opposite polarity, which are shown at E and F. It will be seen that these impulses commence at a time which is delayed with respect to the beginning of the switching period by one period of the oscillator 1.

The positive-going impulse train E from divider 3 is applied to a circuit 4 which develops from the broad 250 c./s. impulses which are applied to it, narrow impulses of the same repetition frequency but displaced in phase with respect thereto. The narrow impulses G thus developed are applied to a phase-comparator 5 in which they are compared in phase with a synchronizing signal consisting of brief impulses H recurrent at the switching cycle periodicity. For this purpose the synchronizing signal may be converted in a device 6 into a sawtooth signal J. In the present embodiment, the synchronizing signal will be derived from the rotation of the rotating member carrying the transducer heads. The error signal developed by the phase-comparator 5 is applied to oscillator 1 to control its frequency of operation in known manner, so that this frequency is maintained exactly at the appropriate multiple, in the present case the fourth multiple, of the repetition rate of the synchronizing signal.

The output pulse train C from the binary divider 2 which is positive-going at the beginning of the switching period is applied to a further binary divider 7, which is again symmetrically constructed and is preferably identical with dividers 2 and 3. The divider 7 yields output signals K and L, which are 250 c./s. square-wave signals of opposite polarity and of which the impulses commence at the beginning of a switching period.

The 1000 c./s. square-wave B from oscillator 1, the first pulse from which at the beginning of each switching cycle is negative-going, is applied to another binary divider 8 which is again of symmetrical construction and which may be of like construction to dividers 2, 3 and 7. The divider 8 yields 500 c./s. square-wave output signals M, N, which are displaced with respect to signals C, D by one half-cycle of the oscillator signal.

The 500 c./s. square-wave signals M, N are now superimposed upon the 250 c./s. square-wave output signals E, F and K, L of dividers 3 and 7 respectively in networks 9, 10, 11, 12 to yield the complex signals O, P, Q, R. It will be seen that the most positive-going excursions (emphasized by shading) of these complex signals occupy successive, non-overlapping intervals of time, the sequence being O, Q, P, R. These complex signals are used to control the switching channels. Each switching channel comprises one of four pentode tubes 13, 14, 15, 16, which have a common load impedance 17. The signal grid of each of switching tubes 13–16 is fed by way of one of terminals I, II, III, IV, with the signal developed by one of the transducer heads, while signals developed across anode load 17 are fed out for use as required by way of an output terminal 18. Each of switching tubes 13–16 is arranged to be inoperative in the absence of an appropriate positive potential applied to the suppressor grid, this potential being provided by the extreme positive excursion of the complex signal applied thereto. Thus during the first quarter of each switching cycle the tube 13 passes the signal from input terminal I to output terminal 18, during the second quarter, the tube 14 passes the signal from input terminal II, during the third quarter, the tube 15 passes the signal from input terminal III and during the fourth quarter of each cycle the tube 16 passes the signal from input terminal IV.

The switching process takes place with great rapidity, the speed of operation being limited only by the rise-time of the switching impulses. The switching operation will therefore not normally be visible in the reproduced television picture. However, in order in all circumstances to avoid the appearance of switching transients in the picture it is desirable to arrange the switching process to take place only during a line flyback interval. To this end a trigger circuit 19 of known type shown in broken lines may be introduced into the lead by which signal B from oscillator 1 is taken to control divider 8. The trigger circuit 19 is arranged to perform a transition only when the next line synchronizing signal received at terminal 20 occurs after a transition in signal B.

In order to ensure that binary dividers 7 and 8 always operate in the correct phase, additional trigger signals are applied to these circuits. The trigger signals applied to divider 7 are derived from binary divider 3 while the synchronizing signal is used to trigger divider 8.

Any necessary adjustment of the phase of the switching sequence with respect to the movement of the rotary member carrying the transducer heads may be effected by adjusting the phase of the comparison impulse G by means of phase shifter 4. The device by which the synchronizing signal H is produced need not therefore have any very closely adjusted relation to the positions of the transducer heads, since its chief function is to ensure the correct switching sequence.

Although the present invention has hereinbefore been particularly described with reference to its application to reproducing apparatus for magnetically recorded television signals, it will be obvious that it may equally well be applied in all cases where a sequence of switching operations is to be performed in cyclic repetition.

What is claimed as new and desired to be secured by Letters Patent is:

1. An electronic switch for connecting a plurality of input terminals to an output terminal in a non-overlapping sequence of which the periodicity is equal to that of a synchronizing signal, comprising an oscillation generator operable at a frequency which is a multiple of the periodicity of said synchronizing signal, means for deriving the frequency division from the output of said oscillator a comparison signal repetitive at the periodicity of said synchronizing signal, phase comparator means for comparing said comparison signal with said synchronizing signal to develop an error signal of which the magnitude represents any discrepancy from a predetermined phase relation between said synchronizing and comparison signals, means for applying said error signal to control the frequency of said oscillator so as at least substantially to maintain said predetermined phase relation, means for deriving by repeated binary frequency division from the output of said oscillator square-wave signals of different frequency and polarity, means for combining selected ones of said square-wave signals to yield a said plurality of complex signals each including a portion of maximum excursion recurrent at the periodicity of said synchronizing signal and having mutually exclusive, equal durations together equal to the periodic time of said synchronizing signal, and means for applying said complex signals to respective switching devices each controlling a signal channel connecting an individual one of said input terminals to said output terminal in such a manner that only the maximum positive-going excursions in said complex signals cause said switching devices to allow signals to pass.

2. An electronic switch for connecting four input terminals to an output terminal in a non-overlapping sequence of which the periodicity is equal to that of a synchronizing signal, comprising an oscillation generator operable at a frequency which is the fourth multiple of the periodicity of said synchronizing signal and arranged to deliver antiphased first and second square-wave signals of which the impulses next following the commencement of a switching cycle are respectively positive- and negative-going, a first binary divider fed with said first square-wave signal and arranged to deliver antiphased third and fourth square-wave signals having twice the periodicity of said synchronizing signal and of which the impulses next following the commencement of a switching cycle are respectively positive- and negative-going, a second binary divider fed with said third square-wave signal and arranged to deliver antiphased fifth and sixth square-wave signals having the same periodicity as said synchronizing signal, of which a transition is coincident with the commencement of a switching cycle and of which the impulses next following the commencement of a switching cycle are respectively positive- and negative-going, a third binary divider fed with said fourth square-wave signal and arranged to deliver antiphased seventh and eighth square-wave signals, having the same periodicity as said synchronizing signal, of which a transition occurs at a time delayed after the commencement of a switching cycle by one period of said oscillation generator, the impulses extant at the commencement of a switching period being respectively negative- and positive-going, means for deriving from said third binary divider a comparison signal, phase comparator means for comparing said comparison signal with said synchronizing signal to develop an error signal of which the magnitude represents any discrepancy from a predetermined phase relation between said synchronizing and comparison signals, means for applying said error signal to control the frequency of said oscillator so as at least substantially to maintain said predetermined phase relation, a fourth binary divider fed with said second square-wave signal and arranged to deliver antiphased ninth and tenth square-wave signals having twice the periodicity of said synchronizing signal of which a transition is delayed with respect to the commencement of a switching cycle by one-half cycle of said second square-wave signal and of which the impulses extant at the commencement of a switching cycle are respectively negative- and positive-going, means for combining said fifth and ninth square-wave signals to develop a first complex signal, means for combining said seventh and tenth square-wave signals to develop a second complex signal, means for combining said sixth and ninth square-wave signals to develop a third complex signal, means for combining said eighth and tenth square-wave signals to develop a fourth complex signal, and means for applying each said complex signal to a switching device controlling the passage of signals from a respective said input terminal to said output terminal.

3. An electronic switch for connecting four heads arranged on a rotating head wheel of a video tape recorder to an output terminal in a non-overlapping sequence of which the periodicity is equal to that of a synchronizing signal occurring once in each turn of the head wheel, comprising an oscillation generator operable at a frequency which is the fourth multiple of the periodicity of said synchronizing signal and arranged to deliver antiphased first and second square-wave signals of which the impulses next following the commencement of a switching cycle are respectively positive- and negative-going, a first binary divider fed with said first square-wave signal and arranged to deliver antiphased third and fourth square-wave signals having twice the periodicity of said synchronizing signal and of which the impulses next following the commencement of a switching cycle are respectively positive- and negative-going, a second binary divider fed with said third square-wave signal and arranged to deliver antiphased fifth and sixth square-wave signals having the same periodicity as said synchronizing signal, of which a transition is coincident with the commencement of a switching cycle and of which the impulses next following the commencement of a switching cycle are respectively positive- and negative-going, a third binary divider fed with said fourth square-wave signal and arranged to deliver antiphased seventh and eighth square-wave signals, having the same periodicity as said synchronizing signal, of which a transition occurs at the time delayed after the commencement of a switching cycle by one period of said oscillation generator, the impulses extant at the commencement of a switching period being respectively negative- and positive-going, means for deriving from said third binary divider a comparison signal repetitive at the periodicity of said synchronizing signal, phase comparator means for comparing said comparison signal with said synchronizing signal to develop an error signal of which the magnitude represents any discrepancy from a predetermined phase relation between said synchronizing and comparison signals, means for applying said error signal to control the frequency of said oscillator so as at least substantially to maintain said predetermined phase relation, a fourth binary divider fed with said second square-wave signal and arranged to deliver antiphased ninth and tenth square-wave signals having twice the periodicity of said synchronizing signal of which a transition is delayed with respect to the commencement of a switching cycle one-half cycle of said second square-wave signal and of which the impulses extant at the commencement of a switching cycle are respectively negative- and positive-going, means for combining said fifth and ninth square-wave signals to develop a first complex signal, means for combining said seventh and tenth square-wave signals to develop a second complex signal, means for combining said sixth and ninth square-wave signals to develop a third complex signal, means for combining said eighth and tenth square-wave signals to develop a fourth complex signal, and means for applying each said complex signal to a switching device controlling the passage of signals from a respective head to said output terminal.

4. An electronic switch for connecting four heads arranged on a rotating head wheel of a video tape recorder to an output terminal in a non-overlapping sequence of which the periodicity is equal to that of a synchronizing signal occurring once in each turn of the head wheel, comprising an oscillation generator operable at a frequency which is the fourth multiple of the periodicity of said synchronizing signal and arranged to deliver antiphased first and second square-wave signals of which the impulses next following the commencement of a switching cycle are respectively positive- and negative-going, a first binary divider fed with said first square-wave signal and arranged to deliver antiphased third and fourth square-wave signals having twice the periodicity of said synchronizing signal and of which the impulses next following the commencement of a switching cycle are respectively positive- and negative-going, a second binary divider fed with said third square-wave signal and arranged to deliver antiphased fifth and sixth square-wave signals having the same periodicity as said synchronizing signal, of which a transition is coincident with the commencement of a switching cycle and of which the impulses next following the commencement of a switching cycle are respectively positive- and negative-going, a third binary divider fed with said fourth square-wave signal and arranged to deliver antiphased seventh and eighth square-wave signals, having the same periodicity as said synchronizing signal, of which a transition occurs at the time delayed after the commencement of a switching cycle by one period of said oscillation generator, the impulses extant at the commencement of a switching period being respectively negative- and positive-going, means for deriving from said third binary divider a comparison signal repetitive at the periodicity of said synchronizing signal, phase comparator means for comparing said comparison signal with said synchronizing signal to develop an error signal of which the magnitude represents any discrepancy from a predetermined phase relation between said synchronizing and comparison signals, means for applying said error signal to control the frequency of said oscillator so as at least substantially to maintain said predetermined phase relation, a fourth binary divider fed with said second square-wave signal and arranged to deliver antiphased ninth and tenth square-wave signals having twice the periodicity of said synchronizing signal of which a transition is delayed with respect to the commencement of a switching cycle one-half cycle of said second square-wave signal and of which the impulses extant at the commencement of a switching cycle are respectively negative- and positive-going, means for applying a trigger signal from said third binary divider to said second binary divider and for applying said synchronizing signal to said fourth binary divider, means for combining said fifth and ninth square-wave signals to develop a first complex signal, means for combining said seventh and tenth square-wave signals to develop a second complex signal, means for combining said sixth and ninth square-wave signals to develop a third complex signal, means for combining said eighth and tenth square-wave signals to develop a fourth complex signal, and means for applying each said complex signal to a switching device controlling the passage of signals from a respective head to said output terminal.

5. An electronic switch for connecting four heads arranged on a rotating head wheel of a video tape recorder to an output terminal in a non-overlapping sequence of which the periodicity is equal to that of a synchronizing signal occurring once in each turn of the head wheel, comprising an oscillation generator operable at a frequency which is the fourth multiple of the periodicity of said synchronizing signal and arranged to deliver antiphased first and second square-wave signals of which the impulses next following the commencement of a switching cycle are respectively positive- and negative-going, a first binary divider fed with said first square-wave signal and arranged to deliver antiphased third and fourth square-wave signals having twice the periodicity of said synchronizing signal and of which the impulses next following the commencement of a switching cycle are respectively positive- and negative-going, a second binary divider fed and with said third square-wave signal and arranged to deliver antiphased fifth and sixth square-wave signals having the same periodicity as said synchronizing signal, of which a transition is coincident with the commencement of a switching cycle and of which the impulses next following the commencement of a switching cycle are respectively positive-and negative-going, a third binary divider fed with said fourth square-wave signal and arranged to deliver antiphased seventh and eighth square-wave signals, having the same periodicity as said synchronizing signal, of which a transition occurs at the time delayed after the commencement of a switching cycle by one period of said oscillation generator, the impulses extant at the commencement of a switching period being respectively negative- and positive-going, means for deriving from said third binary divider a comparison signal repetitive at the periodicity of said synchronizing signal, phase comparator means for comparing said comparison signal with said synchronizing signal to develop an error signal of which the magnitude represents any discrepancy from a predetermined phase relation between said synchronizing and comparison signals, adjustable phase-shifting means included in the signal path by which said comparison signal is fed to said phase comparator, means for applying said error signal to control the frequency of said oscillator so as at least substantially to maintain said predetermined phase relation, a fourth binary divider fed with said second square-wave signal and arranged to deliver antiphased ninth and tenth square-wave signals having twice the periodicity of said synchronizing signal of which a transition is delayed with respect to the commencement of a switching cycle one-half cycle of said second square-wave signal and of which the impulses extant at the commencement of a switching cycle are respectively negative- and positive-going, means for combining said fifth and ninth square-wave signals to develop a first complex signal, means for combining said seventh and tenth square-wave signals to develop a second complex signal, means for combining said sixth and ninth square-wave signals to develop a third complex signal, means for combining said eighth and tenth square-wave signals to develop a fourth complex signal, and means for applying each said complex signal to a switching device controlling the passage of signals from a respective head to said output terminal.

6. An electronic switch for connecting four heads arranged on a rotating head wheel of a video tape recorder to an output terminal in a non-overlapping sequence of which the periodicity is equal to that of a synchronizing signal occurring once in each turn of the head wheel, comprising an oscillation generator operable at a frequency which is the fourth multiple of the periodicity of said synchronizing signal and arranged to deliver antiphased first and second square-wave signals of which the impulses next following the commencement of a switching cycle are respectively positive- and negative-going, a first binary divider fed with said first square-wave signal and arranged to deliver antiphased third and fourth square-wave signals having twice the periodicity of said synchronizing signal and of which the impulses next following the commencement of a switching cycle are respectively positive- and negative-going, a second binary divider fed with said third square-wave signal and arranged to deliver antiphased fifth and sixth square-wave signals having the same periodicity as said synchronizing signal, of which a transition is coincident with the commencement of a switching cycle and of which the impulses next following the commencement of a switching cycle are respectively positive- and negative-going, a third binary divider fed with said fourth square-wave signal and arranged to deliver antiphased seventh and eighth square-wave signals, having the same periodicity as said synchronizing signal, of which a transition occurs at the time delayed after the commencement of a switching cycle by one period of said oscillation generator, the impulses extant at the commencement of a switching period being respectively negative- and positive-going, means for deriving from said third binary divider a comparison signal repetitive at the periodicity of said synchronizing signal, phase comparator means for comparing said comparison signal with said synchronizing signal to develop an error signal of which the magnitude represents any discrepancy from a predetermined phase relation between said synchronizing and comparison signals, means for applying said error signal to control the frequency of said oscillator so as at least substantially to maintain said predetermined phase relation, a fourth binary divider fed with said second square-wave signal and arranged to deliver antiphased ninth and tenth square-wave signals having twice the periodicity of said synchronizing signal of which a transition is delayed with respect to the commencement of a switching cycle one-half cycle of said second square-wave signal and of which the impulses extant at the commencement of a switching cycle are respectively negative- and positive-going, said fourth binary divider including a trigger circuit yielding a transition in its output signal only when a line synchronizing signal occurs in a television signal applied thereto, means for combining said fifth and ninth square-wave signals to develop a first complex signal, means for combining said seventh and tenth square-wave signals to develop a second complex signal, means for combining said sixth and ninth square-wave signals to develop a third complex signal, means for combining said eighth and tenth square-wave signals to develop a fourth complex signal, and means for applying each said complex signal to a switching device controlling the passage of signals from a respective head to said output terminal.

7. A method for connecting a plurality of input terminals to an output terminal in a non-overlapping sequence of which the periodicity is equal to that of a synchronizing signal, concerning the steps of generating an oscillation at a frequency which is a multiple of the periodicity of said synchronizing signal, deriving by frequency division from said oscillation a comparison signal repetitive at the periodicity of said synchronizing signal, comparing said comparison signal with said synchronizing signal, developing an error signal of which the magnitude represents any discrepancy from a predetermined phase relation between said synchronizing and comparison signals, controlling the frequency of said oscillation by said error signal so as at least substantially to maintain said predetermined phase relation, deriving by repeated binary frequency division from said oscillation square-wave signals of different frequency and polarity, combining selected ones of said square-wave signals to yield a said plurality of complex signals each including a portion of maximum excursion recurrent at the periodicity of said synchronizing signal and having mutually exclusive, equal durations together equal to the periodic time of said synchronizing signal and applying said complex signals to respective switching devices each controlling a signal channel connecting an individual one of said input terminals to said output terminal in such a manner that only the maximum positive-going excursion in said complex signals cause said switching devices to allow signals to pass.

References Cited in the file of this patent

Rotary-Head Switching in the Ampex Video Tape Recorder, Journal of the SMPTE, April 1957, vol. 66, pages 184–188.